(12) United States Patent
Dintchev et al.

(10) Patent No.: US 12,231,588 B1
(45) Date of Patent: Feb. 18, 2025

(54) METHOD AND SYSTEM FOR CERTIFICATION OF ACTOR MODEL MESSAGES STORED IN EVENT STORES UTILIZING TRADITIONAL DATA STORAGE COMBINED WITH BLOCKCHAIN SMART CONTRACTS

(71) Applicant: Galena Hills, Inc., Reno, NV (US)

(72) Inventors: Dimitre Ognianov Dintchev, Reno, NV (US); Stuart Corrans, Reno, NV (US); Matt Turrino, Reno, NV (US)

(73) Assignee: Galena Hills, Inc., Reno, NV (US)

( * ) Notice: Subject to any disclaimer, the term of this patent is extended or adjusted under 35 U.S.C. 154(b) by 332 days.

(21) Appl. No.: 16/829,905

(22) Filed: Mar. 25, 2020

Related U.S. Application Data

(60) Provisional application No. 62/825,220, filed on Mar. 28, 2019.

(51) Int. Cl.
*H04L 9/00* (2022.01)
*G06F 9/54* (2006.01)
*H04L 9/32* (2006.01)

(52) U.S. Cl.
CPC ............ *H04L 9/3297* (2013.01); *G06F 9/547* (2013.01); *H04L 9/3236* (2013.01); *H04L 9/3268* (2013.01); *H04L 9/50* (2022.05)

(58) Field of Classification Search
CPC ... H04L 9/3297; H04L 9/3236; H04L 9/3268; H04L 9/50; G06F 9/547
See application file for complete search history.

(56) References Cited

U.S. PATENT DOCUMENTS

| | | | | |
|---|---|---|---|---|
| 2019/0013948 | A1* | 1/2019 | Mercuri | G06Q 20/3827 |
| 2020/0112437 | A1* | 4/2020 | Nakamura | H04L 9/3236 |
| 2020/0204557 | A1* | 6/2020 | Singh | H04L 67/306 |

OTHER PUBLICATIONS

"Carlos Molina-Jimenez, on and off-blockchain enforcement of smart contracts, Euro-Par 2018: Parallel Processing Workshops: Euro-Par 2018 International Workshops, Turin, Italy, 208, pp. 342-354" (Year: 2018).*

* cited by examiner

*Primary Examiner* — Kevin Ayala
(74) *Attorney, Agent, or Firm* — Plager Schack LLP; Mark H. Plager, Esq.; Stephen Hallberg, Esq.

(57) ABSTRACT

A method and system for certification of actor model messages stored in event stores utilizing traditional data storage combined with blockchain smart contracts is disclosed. The method and system do not rely solely on blockchain storage mechanisms, which are plagued with high latency, low throughput, and variable cryptocurrency transaction costs (particularly in the case of "public" blockchain networks). Instead, the method and system hybridizes traditional cloud-based storage methods with blockchain smart contract technology, enabling the storage, certification, and re-verification of high-volume data (i.e., large files). This hybridization may eliminate the need for cryptocurrency exchanges, in particular when leveraging a private blockchain network free of cryptocurrencies, which further promotes functionality at low, fixed cost.

4 Claims, 6 Drawing Sheets

METHOD AND SYSTEM FOR CERTIFICATION OF ACTOR MODEL MESSAGES STORED IN EVENT STORES UTILIZING TRADITIONAL DATA STORAGE COMBINED WITH BLOCKCHAIN SMART CONTRACTS

CLAIM OF BENEFIT TO PRIOR APPLICATION

This application claims benefit to U.S. Provisional Patent Application 62/825,220, entitled "A method and system for certification of actor model messages stored in event stores utilizing traditional data storage combined with blockchain smart contracts," filed Mar. 28, 2019. The U.S. Provisional Patent Application 62/825,220 is incorporated herein by reference.

BACKGROUND

Embodiments of the invention described in this specification relate generally to message-based actor model systems, and more particularly, to an immutable blockchain technology-based actor model state certification method and system.

Message-based Actor Model systems are commonplace in enterprise software implementations in order to model complex entities. When combined with Event Sourcing (ES) persistence, such systems have benefit of the ability to recreate the state of an Actor at any previous point in time. This is achieved through persisting a representation of received, external command messages (Messages) that have been accepted and applied by the Actor. External command messages are then reinterpreted as accepted, internal Event messages, which represent instructions to change the Actor's state.

A common reason for Actor Model systems to be combined with Event Sourcing is to allow each state transition of the Actor to be re-enacted, through sequential replay of the events associated with the Actor.

Another common reason for Actor Model systems to be combined with Event Sourcing is to allow the latest state of the Actor to be re-created, such as when the state of the Actor is no longer in working computer memory.

According to the current state of the art, persistence of Event Messages applied by an Actor through traditional (off-chain) storage mechanisms is not inherently tamper-proof, as such stored Event Messages can potentially be subjected to change (malicious or accidental) or complete Message deletion. Consequently, such changes could result in corruption of the state of the Actor (i.e., missing, inaccurate, falsified, or corrupted data).

On the other hand, blockchain smart contracts are an emerging technology for the immutable certification of data. However, the blockchain smart contract marketplace currently lacks a process which facilitates tamper-proof transactions in a cost-efficient and high-volume manner. This is due in large part because the current state of the art in blockchain software solutions that do not hybridize with off-chain storage mechanisms cannot track or process high volumes of information (a) absent of the usage of cryptocurrencies, and (b) without significant challenges related to transaction latency, through-put, and efficacy. Consequently, blockchain-powered technologies have not yet been adopted as wide-spread software solutions in domains requiring real-time, high volume functionality commonly found in traditional data storage mechanisms.

The current state of the art in blockchain smart contract technology—including software—relies on transactions requiring the usage of cryptocurrencies. Such usage is ineffective in cost and resources given the variable "exchange rate" between a cryptocurrency and fiat currency at the time of each transaction. Furthermore, cryptocurrency usage is typically associated with computationally heavy mining processes that result in reduced throughput and high latency. Thus, the utilization of cryptocurrency-based blockchain smart contract technologies to model complete Actor Systems does not exhibit real-time functionality given that the underlying blockchain technology is (a) slow to execute and (b) costly in terms of accommodating the storage of large amounts of data.

Therefore, what is needed is a way to hybridize traditional cloud-based storage methods with blockchain smart contract technology, enabling the storage, certification, and re-verification of high-volume data (i.e., large files), while eliminating the need for cryptocurrency exchanges through the use of a private blockchain network (as opposed to public, cryptocurrency-based networks).

BRIEF DESCRIPTION

A novel, immutable blockchain technology-based actor model state certification method and system that utilizes traditional data storage to persistently store actor model messages in event stores while also leveraging blockchain smart contracts to certify the persisted actor model messages, is disclosed.

In some embodiments, the immutable blockchain technology-based actor model state certification method and system provides a hybridization of blockchain smart contract technology with traditional data storage mechanisms. In some embodiments, the hybridization of blockchain smart contract technology with traditional data storage mechanisms ensures tamper-proof persistence of all event messages ("Events") pertinent to the (re) construction of the state of any actor instance in an actor system by (i) creating a blockchain smart contract instance for each actor instance, (ii) obtaining a cryptographic digital hash ("Hash") for each Event message as it is applied by the actor instance, and (iii) storing event message data on an appropriate blockchain transaction executed on a smart contract instance dedicated to the actor instance. In some embodiments, the event message includes the Hash, an off-chain storage location ("Storage Key") of the serialized Event message, and a timestamp.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary, as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
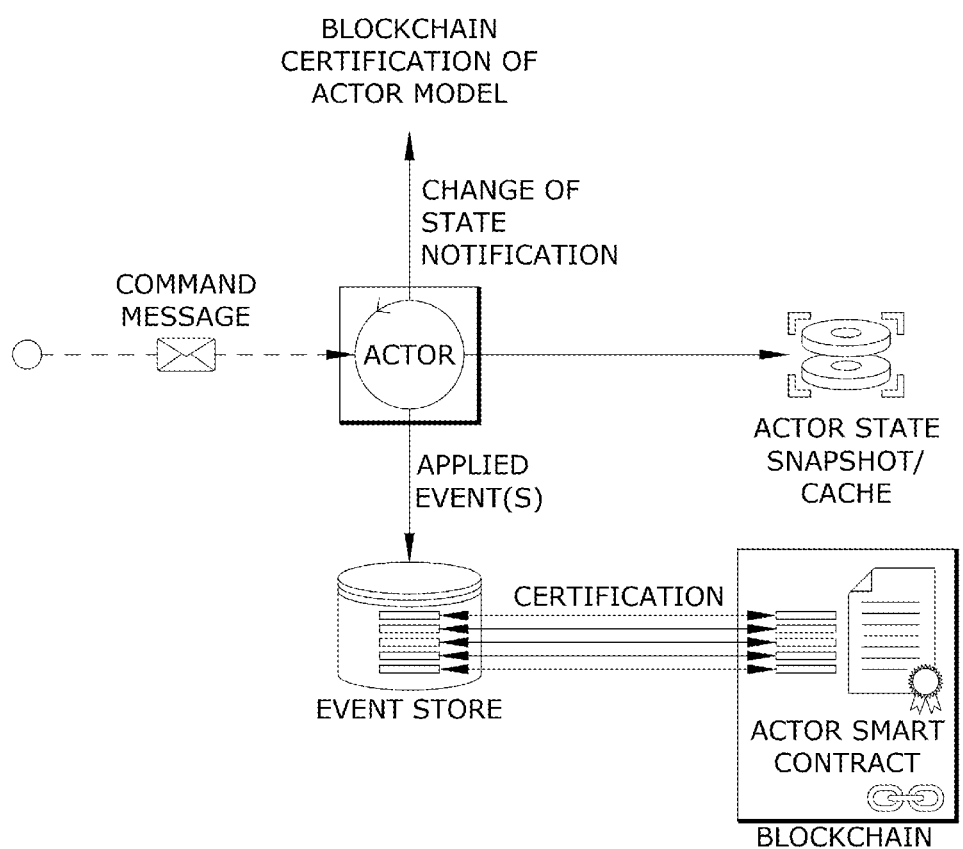
FIG. 1 conceptually illustrates utilization of traditional data storage to persistently store actor model messages in event stores combined with blockchain smart contracts to certify the persisted actor model messages and the ongoing state of the actor model by an immutable blockchain technology-based actor model state certification method and system in some embodiments.

In the following detailed description of the invention, numerous details, examples, and embodiments of the immutable blockchain technology-based actor model state certification method and system are described. However, it will be clear and apparent to one skilled in the art that the invention is not limited to the embodiments set forth and that the invention can be adapted for any of several applications. In addition, the present specification defines several terms, as follows:

Actor Model System—a computer program representing the state, and behavior of a modeled entity or system of entities through the delivery of messages upon unique instances of Actors.

Actor (Instance)—a single Actor, representing the modeled state of a single entity. For instance, an Actor Instance could represent a single Bank Account, where messages sent to the Actor would represent transactions intended for this Bank Account.

Actor Identifier (ActorId)—a unique number or string within the Actor System which represents an instance of an Actor that may be utilized to identify the Actor for incoming messages and verifications pertaining to that Actor's state. For instance, the Bank Account Number could be the identifier for a Bank Account Actor Instance.

Actor Contract—an instance of a Blockchain Smart Contract which co-exists with an instance of a traditional Actor (see Actor Model System).

Command (Message)—A message sent to an Actor, from any external origin, including from a user, from another system, or from another Actor. Although the receipt of a Command Message by an Actor, and the creation of a corresponding Event Message may often seem similar, the cardinality of the messages is one Command Message to zero or more Event Messages. For example, an Actor receiving a Command Message may decide not to apply an Event Message if the Command message was determined not to illicit a state change to the Actor or determined to have an inauthentic or unauthorized source.

Event (Message)—an internal representation of a Command Message which has been accepted by an Actor (see also Event Sourcing). The Event Message includes sufficient information for the Actor to reliably re-apply the state change affected by this Event Message.

Event Store—a persistent storage of Event Messages, keyed by an Actor's identifier (ActorId).

Event Sourcing—a computer program implementation of Event Sourcing allowing a sequence of Event Messages to be replayed sequentially from start to finish over a full life cycle of an Actor Instance in order to recreate the latest state of the Actor.

Applied Message (Application of an Event Message to an Actor's state)—the act of transitioning the state of an Actor by applying (or re-applying) an Event which has been accepted by the Actor.

Blockchain—The system of arranging and storing sequenced transactions in blocks, in which each subsequent block includes a cryptographic hash of the previous block as well as a timestamp, rendering data to be stored on an immutable distributed blockchain ledger, which is resistant to modification.

Ethereum—A popular blockchain technology platform which allows both public and private node deployments, and which enables the execution of smart contracts.

Ethereum Transaction Hash—the unique identifier associated with each transaction applied to an Ethereum blockchain. A Transaction Hash can be utilized to later retrieve details about a prior transaction.

Ethereum Contract Address—the unique identifier associated with each instance of any smart contract executed against an Ethereum blockchain. The Contract Address can be used to retrieve details of a Contract, and all Subsequent Contract transactions applied to this same smart contract.

On-Chain (storage of data)—referring to data which is stored on a blockchain, including Smart Contract Instances and Transactions executed on such Smart Contracts. On-Chain data storage is resilient to data corruption, loss, and/or tampering.

Off-Chain (storage of data)—referring to data which is persisted to any storage medium other than a blockchain, including computer file systems, removable media, SQL databases, or NoSQL databases. Off-Chain storage is generally more performant than On-Chain storage, but is also more prone to tampering and/or data corruption.

(Off-Chain) Storage Key (of an Event Message)—a storage location identifier which can be accessed in an unambiguous manner in order to retrieve the Serialized Event Message used by an Actor Instance to recreate its state.

(Cryptographic) Hash—a one-way hash function generated through algorithms regarded as secure by the NIST, such as SHA-256.

Serialization (of a Message)—the act of writing an in-memory representation of an object or objects to a stream of data in a standardized and encoded protocol, such as those exemplified by JSON, XML or Google Protobuf.

Deserialization (of a Message)—the act of reversing a serialized stream of data into an in-memory representation of an object.

Smart Contract ("Contract")—a computer protocol intended to digitally facilitate, verify, or enforce the negotiation or performance of a contract. Smart Contracts contain programmatic rules per agreed upon by the parties to each contract. The computerized execution of these rules allow for the digitized (automated) self-execution of credible transactions between contract participants without the need to engage a third party (intermediary) traditionally required to enforce/oversee contractual performance. The recording of Smart Contracts and their corresponding transactions are trackable and immutable (irreversible). This process is ensured via certain specific smart contract Blockchain technologies.

Authenticated User—any User who has provided valid identification (such as digital credentials) and has been authenticated by an Actor System.

Actor History—the list of actions that have performed against an Actor.

Artifact Storage—the secure cloud-based storage of serialized commands.

Command Type—the nature of the action being requested against an Actor, such as "Add File".

(Contract) Function—actions that can be performed on a smart contract, given its current state.

Ledger—any distributed, immutable ledger based on blockchain technology that can permanently record transactions to be verified at any later point in time.

Ledger Action—an intermediary, in-memory structure that can map a user command to a Function of an Actor's Contract.

In some embodiments, the immutable blockchain technology-based actor model state certification method and system ensures tamper-proof persistence of all Event Messages ("Events") pertinent to the (re) construction of the state of any Actor Instance in an actor system by hybridizing blockchain smart contract technology with traditional data storage mechanisms. In some embodiments, the hybridization of blockchain smart contract technology with traditional data storage mechanisms ensures tamper-proof persistence of all Events pertinent to the (re) construction of the state of any actor instance in an actor system by (i) creating a blockchain smart contract instance for each Actor instance, (ii) obtaining a cryptographic digital hash ("Hash") for each Event message as it is applied by the Actor instance, and (iii) storing event message data on an appropriate blockchain transaction executed on a smart contract instance dedicated to the Actor instance. In some embodiments, the event message data stored includes the Hash, an off-chain storage location ("Storage Key") of the serialized Event message, and a timestamp.

Embodiments of the immutable blockchain technology-based actor model state certification method and system described in this specification solve many problems, such as those noted above, by combining traditional cloud-based data storage systems—characterized by high availability, low latency, and high throughput—with blockchain smart contract technology—characterized by the ability to immutably store and guarantee the authenticity of data. This hybridization may be utilized with cryptocurrency-powered distributed ledger networks or with private blockchain networks that do not require the exchange of cryptocurrencies, thereby enabling the consumer of data to store and verify that data in high volumes and at low, fixed costs.

Additionally, while the immutable blockchain technology-based actor model state certification method and system may leverage public blockchain networks, which are powered by cryptocurrencies, it may achieve high performance levels in practice when hybridized with private, proof-of-authority distributed ledger systems (e.g., Microsoft Azure Workbench (AWB)) that do not require the use of cryptocurrencies.

By way of example, FIG. 1 conceptually illustrates utilization of traditional data storage to persistently store actor model messages in event stores combined with blockchain smart contracts to certify the persisted actor model messages and the ongoing state of the actor instance by an immutable blockchain technology-based actor model state certification method and system 100. As shown in this figure, the authenticity of the Event messages applied by an Actor instance and contained in the event store may be verified at any point in time in the actor's life cycle, since the actor state is defined by the correct sequencing of events contained in the event store. This is done by retrieving the full smart contract associated with the actor ID from the blockchain, then recomputing the hashes of each of the event messages, and comparing the computed hashes to each of the recorded hashes stored in the smart contract transactions associated with each of the event messages.

Furthermore, the correctness of the state of any complete and deterministic cache image (such as a snapshot) of an actor's state may be established, by applying all event messages which have been authenticated in sequence to a new actor instance, acquiring a snapshot image using the identical snapshot function against the verified actor instance, and then by comparing the unverified snapshot to the verified snapshot image. Also, the correctness of any deterministic projection or subset of data derived from the actor's state may be established, by applying all event messages which have been authenticated in sequence to a new actor instance, performing the identical projection used against the verified actor instance, and then by comparing the unverified actor projection to the verified actor projection.

In some embodiments, the actor model utilizes event sourcing to persist accepted event messages which, when applied to an actor instance, changes the state of the actor instance ("Applied Event Message").

In some embodiments, event messages are serializable, thereby allowing event messages to be persisted in an event store.

In some embodiments, each message relating to an actor is serialized and persisted in any suitable off-chain storage mechanism (e.g., SQL, NoSQL, etc.).

In some embodiments, an unambiguous means of identifying the off-chain storage location for each serialized Event message is required (the "Storage Key").

In some embodiments, there is one smart contract instance created on the blockchain associated to each new actor instance ("Actor Contract" or "Actor Smart Contract").

In some embodiments, a digital cryptographic one-way hash ("Hash") is generated for each Event message, by applying a current, NIST-approved hashing to the Serialized Event Message.

In some embodiments, the Hash, along with the received timestamp, and the Storage Key are recorded as a transaction on the associated Actor Smart Contract.

In some embodiments, the actor system's performance is further optimized by utilizing a snapshot of an Actor's current state, persisted in suitable off-chain storage.

In some embodiments, the actor system's performance is further optimized by routing messages to actor instances whose current state is permanently hydrated in computer memory.

As per traditional Actor Model and Event Sourcing architectures, any current or previous state of each Actor Instance may be recreated at any time by retrieving all Event messages applied by the Actor with a timestamp dated on, or before this point in time, and then applying these Event messages in correct sequence to a new Actor Instance.

Embodiments of the immutable blockchain technology-based actor model state certification method and system described in this specification differ from and improve upon currently existing options. Unlike existing conventional blockchain systems that rely solely on blockchain storage mechanisms, which are plagued with high latency, low throughput, and variable cryptocurrency transaction costs (particularly in the case of "public" blockchain networks), the immutable blockchain technology-based actor model state certification method and system of the present disclosure hybridizes traditional cloud-based storage methods with blockchain smart contract technology, thus enabling the storage, certification, and re-verification of high-volume data (i.e., large files). This hybridization may eliminate the need for cryptocurrency exchanges, providing that the immutable blockchain technology-based actor model state certification method and system leverages a private blockchain network (free of cryptocurrencies), which further promotes functionality at low, fixed cost. This hybridization is demonstrated next, by reference to FIG. 2.

Figure 2:
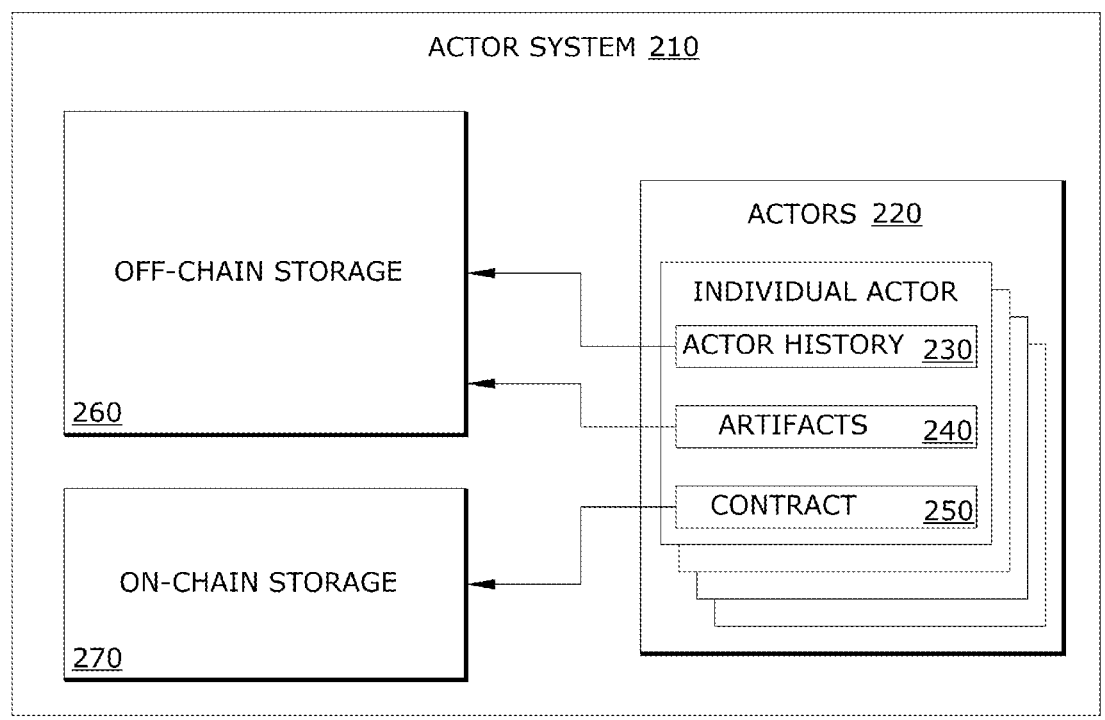
FIG. 2 conceptually illustrates an actor system in some embodiments of an immutable blockchain technology-based actor model state certification system.

Specifically, FIG. 2 conceptually illustrates an actor system in some embodiments of an immutable blockchain technology-based actor model state certification system 200. In this example, actor model messages of the actor system are stored in event stores off-chain and are certified with blockchain smart contracts. As shown in this figure, an actor system 210 includes a collection of actor instances 220. Each individual actor 220 includes an actor history 230, actor artifacts 240, and an actor contract 250. The actor history 230 of each actor 220 includes a list of actions accepted and performed on the individual actor instance 220. The actor artifacts 240 are records of each message submitted by an authenticated user against an individual actor 220, each of which is accepted and mapped by the actor system 210 to an event, and then applied to the correct actor instance 220. The actor contract 250 is a single smart contract instance that underpins each actor instance 220. The actor system 210 further includes off-chain storage 260 and on-chain storage 270. The actor's data is persisted (stored) in different manners, depending on the off-chain storage component chosen and deployed for use with the immutable blockchain technology-based actor model state certification system. The actor history 230 and actor artifacts 240 are stored/persisted in the off-chain storage 260 while the smart contract 250 for the actor instance 220 is stored/persisted on-chain (i.e., on-chain storage 270). The actor messages are all tracked by the off-chain storage 270. Also, the off-chain storage 270 can be of any data storage mechanism or database, such as (without limitation) SQL for Azure, Azure BlobStorage, etc. Meanwhile, the actor contract 250 or smart contract must be stored on-chain 270—or rather, in a blockchain ledger. Further details of the role of each component, and how and when data is stored and accessed, are described below, by reference to FIGS. 3-5.

An example implementation of at least one embodiment of an immutable blockchain technology-based actor model state certification method and system is utilized to establish, track, and certify (including verifying and guaranteeing) the correct state of an actor modeling a domain entity at a certain point in time. Examples of a domain entity include a bank account or an insurance claim.

In some embodiments, the immutable blockchain technology-based actor model state certification method and system is deployed as a cloud computing application. An example cloud computing application implementation of the immutable blockchain technology-based actor model state certification method and system may be found at Arene.io ("Arene", "The Application"). Arene exposes a user interface (named "Workspaces"), which enables collaborative file sharing between users (members of the Arene platform) and offers core functionality in several areas, including, without limitation, (i) the ability to create a Workspace Entity ("Workspace Actor") by a platform user authorized to do so (such as a "Workspace Administrator" or "Administrator"), (ii) the ability to contribute files of various formats which are related to the Workspace, (iii) the ability to add or remove additional users ("Collaborators") from the Workspace, thereby enabling them to contribute or view information related to the Workspace, and (iv) the ability on the part of an Administrator or a collaborator (contributing user) to add, modify, remove, and certify any information (files of various formats) related to the Workspace.

To use the immutable blockchain technology-based actor model state certification method and system of the present disclosure, client users may interact with software that implements an Arene client and is able to carry out the functions of the immutable blockchain technology-based actor model state certification method and system in the hybridization of off-chain storage-based actor modeling with blockchain smart contracts.

Figure 3:
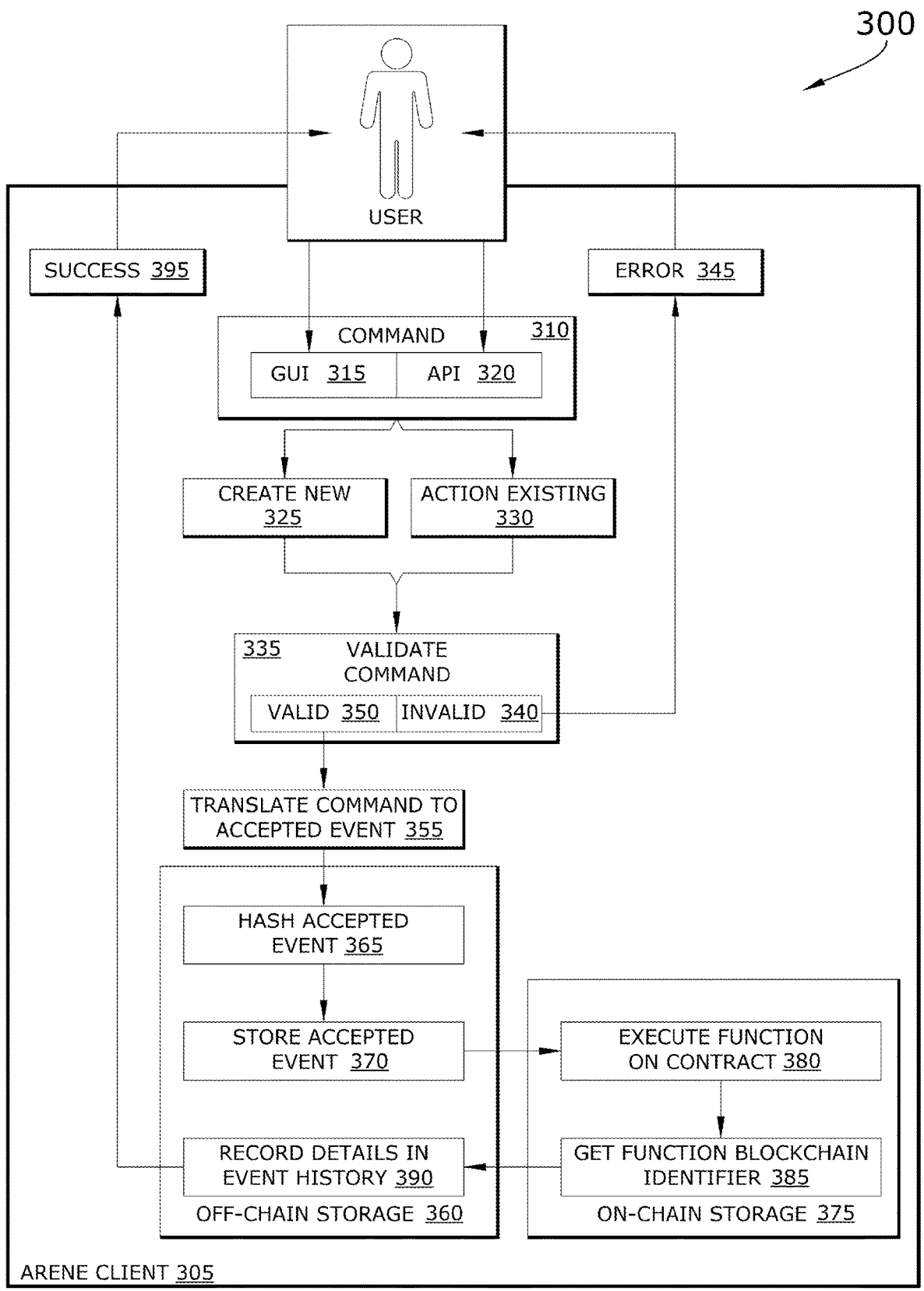
FIG. 3 conceptually illustrates an immutable blockchain technology-based actor model state certification method for certifying the state of an actor model stored off-chain by way of a blockchain smart contract in some embodiments.

By way of example, FIG. 3 conceptually illustrates an immutable blockchain technology-based actor model state certification method 300 for certifying the state of an actor model stored off-chain by way of a blockchain smart contract. The immutable blockchain technology-based actor model state certification method 300 shown in this figure is implemented by an Arene client application (or another application with similar functionality, any of which are also referred to in this example as "Arene", "Arene client", or "Arene application") and performed by an authorized user interacting with the Arene client. As shown in this figure, a user interfaces with an Arene client 305. The user in this example is an authenticated user and can interact by command 310. The command 310 is (or any such commands 310 are) enabled by a graphical user interface (GUI) 315, which intakes user input data, and an application programming interface (API) 320, which processes the user input data. In some embodiments, the GUI 315 allows the user to browse the exposed entities and functions of the Arene client 305, such as those described above. Such entities are mapped to Actor instances. The user may browse the Arene client 305 entities, request to view the state and history of entities mapped to Actor instances, and may submit actions against them. Such actions are processed by programmatic function calls (such as by RESTful API calls) and data transfers between the GUI 315 and the API 320, while in some embodiments, the API 320 exposes functionality comparable to that of the GUI 315.

In some embodiments, the user can issue a command 310 via the GUI 315 which is thereafter processed by way of the API 320. In some embodiments, the command 310 is one of two types of commands the user can request, including a create command 325 and an action existing command 330. In some embodiments, the new command 325 is a request to create a new Actor. In some embodiments, the action existing command 330 is a request to submit an action against a specific, existing Actor, which is uniquely identified by the Actor system. In some embodiments, the command 310 includes one or more parameters. In some embodiments, the commands 310 and its associated parameters are serializable in a data transfer format that is suitable for transmitting the type of command and the parameters. An example of a suitable data transfer format in which the command 310 and its parameters can be serialized is JavaScript Object Notation ("JSON"), although a person of ordinary skill in the relevant art would appreciate other data transfer formats that may be suitable for serialized transmission of command 310 data and parameters.

In some embodiments, the immutable blockchain technology-based actor model state certification method 300 validates acceptable commands by a validate command 335 step that is performed for each command 310 requested by the user. Specifically, the validate command 335 performs command validation according to the logic of the Actor. As commands are defined according to the real-life requirements of the Actor system being used, the immutable blockchain technology-based actor model state certification method 300 ensures that the validate command 335 only accepts command messages that fit the definition. In some embodiments, when a new Actor is being created (via the create new command 325), command validation 335 is limited to confirming the correctness of parameters provided by the user, since the Actor has no prior state. In some embodiments, when actions are being performed on an existing Actor (via the action existing command 330), command validation 335 takes into consideration the current state information of the Actor (from either off-chain storage, on-chain storage, or both), in order to verify that the command complies with the current state of the Actor.

When the validate command 335 cannot accept a command 310, the immutable blockchain technology-based actor model state certification method 300 of some embodiments rejects the command 310 as invalid 340 and issues an error 345. Specifically, when the command 310 does not pass validation, it is simply rejected by the system and no action is submitted to the Actor. In some embodiments, the error 345 comprises a failure message generated by the API 320 that may be visually output for display in the GUI 315 to inform the user of the command/action failure. However, when the command 310 fits the definition, then the validate command 335 is acceptable and the command 310 is valid 350. A command 310 that is determined to be valid 350 is retained for further processing, as described next.

In some embodiments, upon determining that the command 310 is valid 350 via the validate command 335 evaluation, the valid command is translated to an accepted event 355 in an in-memory structure according to an applicable event sourcing technique. The translation of the command 310 into the accepted event or applied event may be in a format such as XSD (XML Schema Definition) or JSON schema. As such, any future re-application of all events associated with an Actor instance, when applied in sequence to a fresh Actor, results in reproduction of the same Actor state.

In some embodiments, after translating the command to the accepted event 355, the immutable blockchain technology-based actor model state certification method 300 moves ahead with encryption of the accepted event. In some embodiments, a current NIST-approved cryptographic hash function is used to calculate a hash (Hash) 365 of the serialized bytes including all data related to the accepted event. For example, the SHA2-256 hash algorithm may be used to calculate the hash of the accepted event. This is shown in FIG. 3 as a hash accepted event 365. At this point, a new in-memory structure (ledger action) is created to represent the transaction to be eventually stored on the blockchain. The resulting Hash as described above is now added to the ledger action structure. Each incoming accepted event shall be mapped to exactly one ledger action.

In some embodiments, the immutable blockchain technology-based actor model state certification method 300 moves to the next step of storing 370 the accepted event 365. In some embodiments, the accepted event (including all associated parameters) 365 is serialized and persisted as a file to any secure, reliable off-chain storage 360 as per the event-sourcing paradigm. In some embodiments, the storage is cloud-based storage, such as S3 by Amazon Web Services, Inc., or Azure Blob Storage provided by Microsoft Corporation. In some embodiments, the storage needs to provide unambiguous storage location keys (Storage Keys) for each stored accepted event, and needs to permit future access to the persisted accepted events (Artifacts). As such, the Artifacts form part of the Actor's off-chain 360 stored data. Furthermore, permissions to access the serialized accepted events is restricted and only accessible by the actor system implementing the immutable blockchain technology-based actor model state certification method and system. In some embodiments, the resulting access key, pointing to the serialized accepted event, is stored in the in-memory ledger action. In some embodiments, the artifact storage step reduces the byte-size of the ledger action in order to make the subsequent blockchain transaction more economical and efficient. By way of example, the output of the SHA2-256 hashing algorithm is only 256 bits, irrespective of the size of the serialized applied event message, which may be much greater in size than 256 bits.

At this point, the accepted event is fully translated into a ledger action that includes (i) the unique identifier of the user requesting the action (hereinafter also referred to as a "Contributor"), (ii) a timestamp, accurate to acceptable tolerance, representing the time the ledger action was created, (iii) the unique off-chain storage 360 key, pointing to the serialized version of the accepted event (i.e., the "Storage Key"), (iv) the computed hash 365 of the accepted event, and (v) the type of the accepted event, as mapped from the original command 310 message (either a create new command 325 or an action existing command 330 as noted above).

Figure 4:
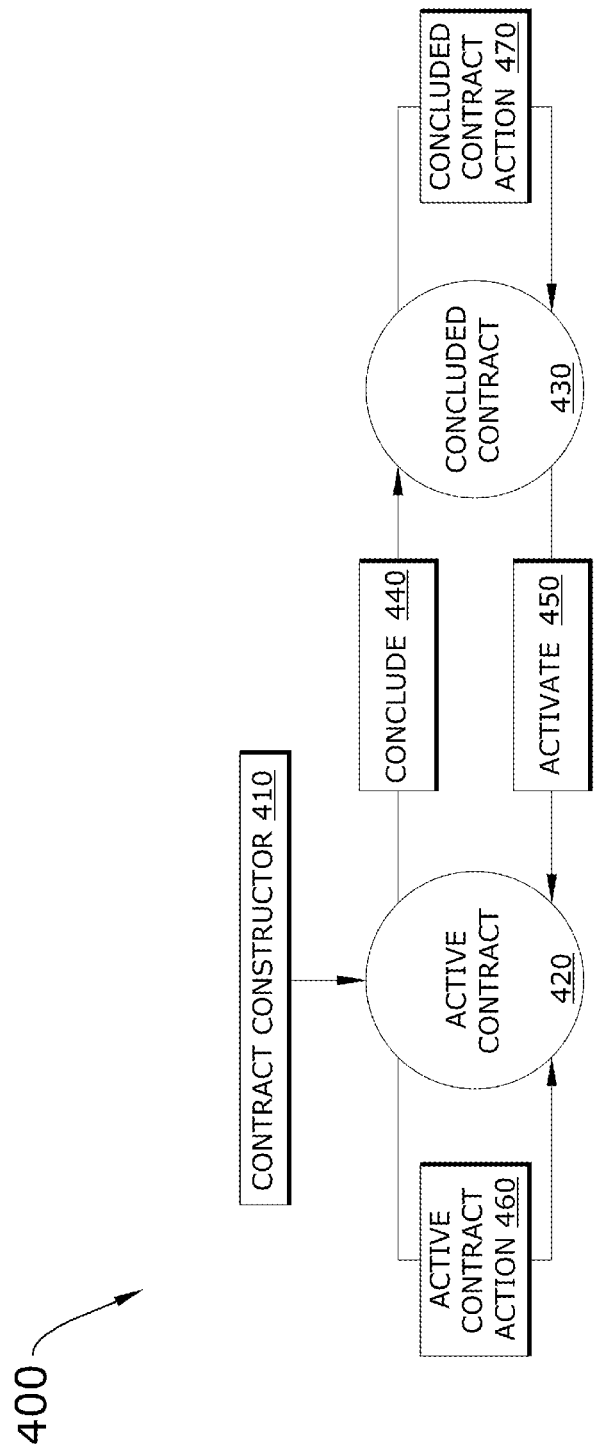
FIG. 4 conceptually illustrates a contract life cycle flow schematic in some embodiments of an immutable blockchain technology-based actor model state certification system.

In some embodiments, the immutable blockchain technology-based actor model state certification method 300 moves to the next step of executing the ledger action (function) 380 on the smart contract for this Actor. In this way, the ledger action is written to the on-chain storage 375 (i.e., the blockchain) via the transaction on the smart contract associated with the Actor. Specifically, when the accepted event requires a new Actor instance (for example, the command 310 is a valid create new command 325 to create a new Actor), a new smart contract for the new Actor will then be created, resulting in a unique smart contract address (e.g., an Ethereum contract address) for the smart contract, and a unique transaction hash being created for the constructor of the contract. On the other hand, for ledger actions submitted against an existing smart contract associated with an existing Actor instance (for example, the command 310 is a valid action existing command 330), a unique transaction hash is created by the on-chain storage 375 (i.e., the blockchain) against the existing Actor instance as located by its unique smart contract address. The type of the accepted event will determine which function 380 of the contract will be called. The mapping between accepted event and contract function, which is further described below, by reference to FIG. 4, is determined by the actor system and may vary according to blockchain utilization of the system. In some embodiments, the blockchain on-chain storage 375 utilized is the public Ethereum Blockchain (main net). In some other embodiments, an Ethereum Private Blockchain (Ethereum) configured for Parity Proof of Authority is used.

In some embodiments, the immutable blockchain technology-based actor model state certification method 300 gets the function blockchain identifier 385 from the on-chain storage 375. In some embodiments, a unique on-chain storage 375 (blockchain) identifier is kept for off-chain storage 360 so that the new contract or function can be tied to the Actor. In the case of a new contract (for a request to create a new Actor), a contract identifier (e.g., a contract address), unique to this blockchain, is returned by the blockchain ledger. In the case of a function, a transaction hash will be returned by the blockchain.

By doing this it is possible to maintain an off-chain record of which actions have been performed on the contract and to map the actions to a specific Actor. Alternatively, any other unique identifier (such as the blockchain block number or contract identifier and transaction hash) derived from the blockchain ledger can be stored, as long as the mapping of the actions from the contract to the Actor can be reconstructed when required, which is further described below, by reference to FIG. 5.

In some embodiments, the immutable blockchain technology-based actor model state certification method 300 records these details in the event history 390 in the off-chain storage 360, which may include any type of suitable permanent storage. In some embodiments, the off-chain storage 360 is part of a relational database management system (RDBMS), such as Microsoft SQL Server. In some embodiments, the off-chain storage 360 includes a Document Store database, such as MongoDB.

In some embodiments, the off-chain record includes (i) the identifier of the Actor (which may be new, if the Actor has been newly created), (ii) the identifier of the user performing the action, (iii) the details of the function performed, and (iv) the identifier of the function performed on-chain, as described above at the step to execute the function on the contract 380.

After recording the details in the event history 390, the immutable blockchain technology-based actor model state certification method 300 of some embodiments notifies the user, via the GUI 315 and/or API 320, of success 395 in carrying out the command.

As described above, each Actor is associated with a smart contract. Specifically, a unique smart contract underpins each Actor (also referred to as the "Actor Contract"). Furthermore, each Actor Contract is configured to be in one of two possible states, namely, an Active Contract state or a Concluded Contract state. An example of this is demonstrated in FIG. 4. Specifically, FIG. 4 conceptually illustrates a contract life cycle flow schematic of an immutable blockchain technology-based actor model state certification system 400. In some embodiments, the Actor Contract enforces the flow of actions committed against it. As shown in this figure, an Actor Contract is created in the active state as an Active Contract 420 by a contract constructor 410, which, in some embodiments, is the only entry point for new Actor Contracts. In connection with any newly created Actor Contract, the corresponding Actor system generates and stores a unique contract identifier (ID).

After creating the Active Contract 420, several different functions for any of several contract modifications may be performed, including concluding the contract, activating the contract, performing an activate contract function, and concluding a contract function. Specifically, a function to Conclude 440 moves the Actor Contract from the Active Contract 420 state to the Concluded Contract 430 state. The Conclude 440 function is only available for Actor Contracts in the Active Contract 420 state. On the other hand, a function to Activate 450 moves the Actor Contract from the Concluded Contract 430 state to the Active Contract 420 state. The Activate 450 function is only available for Actor Contracts in the Concluded Contract 430 state. Also, an Active Contract Action 460 involves a function that carries out a specific action on an Actor Contract in the Active Contract 420 state, such that the Actor Contract remains in the Active Contract 420 state after the action is completed (i.e., the specific action does not cause a change of state via a Conclude 440 contract action). The Active Contract Action 460 is only available for Actor Contracts in the Active Contract 420 state. Additionally, a Concluded Contract Action 470 involves a function that performs a particular action on an Actor Contract in the Concluded Contract 430 state, such that the Actor Contract remains in the Concluded Contract 430 state after the particular action is completed (i.e., the particular action does not cause a change of state via an Activate 450 contract action).

While functions described above may have different combinations of parameters, each of the functions, namely, the Conclude 440 function, the Activate 450 function, the Active Contract Action 460 function, and the Concluded Contract Action 470 function, include a common set of function parameters, which may always be included in some embodiments. In some embodiments, the common set of function parameters include a Contributor parameter, a Storage Key parameter, a Data Hash parameter, and an Event Type parameter. In some embodiments, the Contributor parameter takes a string value for the user identifier (ID) of the user (person or group) who is submitting the action. In some embodiments, the Storage Key parameter takes a string value for the unique off-chain storage key of the artifact representing the action that the user submitted. For example, a universal address or universal resource locator (URL) of the off-chain storage may be used for the Storage Key, such as when the off-chain storage used to persist the artifacts is Azure Blob Storage. In some embodiments, the Data Hash parameter takes a string value for the computer cryptographic hash of the serialized Accepted (or "Applied") Event representing the action submitted by the user. In some embodiments, the Event Type parameter takes a string value for the type of action which the user is submitting. In some embodiments, the Event Type parameter is required in order to differentiate between different types of actions when looking at the history of an Actor Contract.

In some embodiments, performing any (each of) of the actions on a contract results in the parameters for the function being recorded on the Blockchain ledger. In some embodiments, performing any (each of) the actions on the contract also results in an action identifier (ID) being generated and stored by the Actor system. The Action ID, along with the Storage Key and the Data Hash, are fundamental to verifying authenticity of data stored off-chain for any given Actor. While the Actor Contract ensures the flow of actions demonstrated in FIG. 4, any additional rule that may be required by any particular Actor system may be implemented and validated externally in software at the Actor level, rather than in the Actor Contract.

In some embodiments, the cloud computing application implementation of the immutable blockchain technology-based actor model state certification method and system guarantees the creation/persistence of one smart contract for each Workspace actor instance, which is described above in connection with the Arene client. Specifically, some embodiments map each Workspace actor instance to a blockchain smart contract instance.

In some embodiments, the cloud computing application implementation of the immutable blockchain technology-based actor model state certification method and system encapsulates each action undertaken by a user and any data pertaining to the Workspace actor in a message object ("Workspace Transaction") stored off-chain.

In some embodiments, the cloud computing application implementation of the immutable blockchain technology-based actor model state certification method and system ensures that all message objects are simultaneously hashed in memory and stored on-chain as transactions belonging to the appropriate smart contract mapped to the Workspace actor.

In this way, the cloud computing application implementation of the immutable blockchain technology-based actor model state certification method and system guarantees (i) the proper state of each actor at any point in time, (ii) the generation of Workspace actor transaction history items in testament of all prior user actions undertaken upon the Workspace actor, and (iii) the certification of the proper state of each action and the generated Workspace actor transaction history items via the computational matching of in-memory (off-chain) hashes of messages and their corresponding hashes stored on smart contract (on-chain) actions. Thus, the cloud computing application implementation of the immutable blockchain technology-based actor model state certification method and system offers its users the ability to track, visualize, and certify the state of the Workspace file sharing entity at any given point in time.

To make the immutable blockchain technology-based actor model state certification method and system of the present disclosure, one may engineer and craft software that is capable of completing the aforementioned tasks/functionality. However, the nature of the domain logic or data to be certified by the blockchain is flexible. For example, the hash which is committed to the smart contract ledger may be a record of a file upload, a payment transfer, or some other digital process that the end-user requires to be certified. Furthermore, no particular blockchain technology is essential, but rather, it is possible to choose from a multitude of blockchain ledgers, such as public Ethereum, a private chain, or another alternative.

Figure 5:
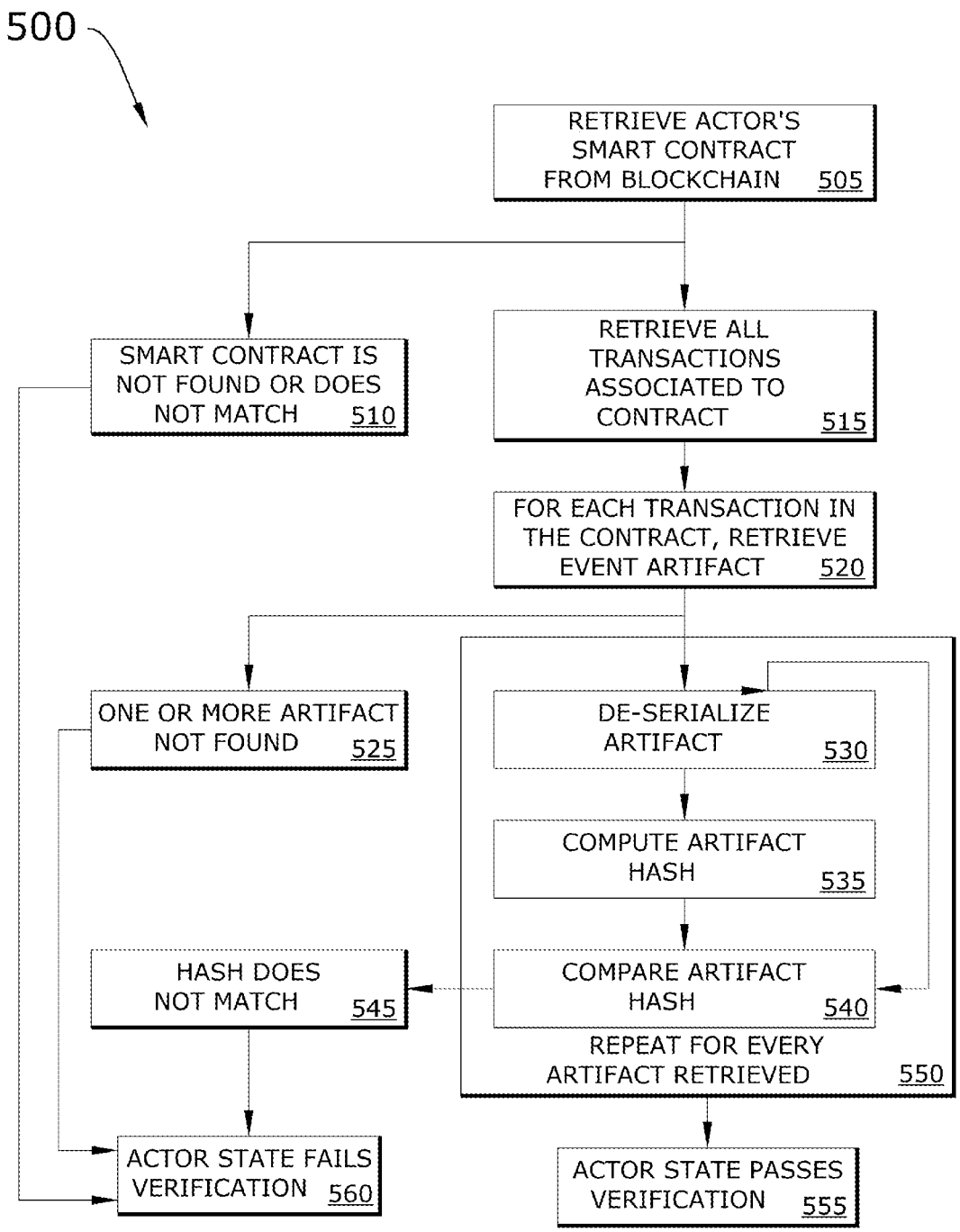
FIG. 5 conceptually illustrates an actor state verification by an immutable blockchain technology-based actor model state certification method in some embodiments.

By way of example, FIG. 5 conceptually illustrates an actor state verification flow chart of a process for verifying the state of an actor 500. As shown in this figure, the process for verifying the state of an actor 500 starts by retrieving an actor's smart contract from the blockchain (at 505). Specifically, the actor instance in need of verification is identified by the actor identifier (ID), and its corresponding smart contract instance is retrieved from the blockchain. In some embodiments, the smart contract is retrieved by way of the contract address, as reported by the blockchain. When the process for verifying the state of an actor 500 cannot located the smart contract at the contract address or the smart contract at the contract address does not match the actor ID (at 510), then no verification of the actor state can occur and the process for verifying the state of an actor 500 proceeds to the step at which actor state verification fails (at 560). On the other hand, when the process for verifying the state of an actor 500 is able to retrieve (at 505) the smart contract from the blockchain, verification of the state of the actor proceeds, which is described in several following steps of the process for verifying the state of an actor 500.

After retrieving the smart contract, the process for verifying the state of an actor 500 of some embodiments retrieves all transactions associated with the retrieved smart contract (at 515). More specifically, in retrieving all transactions associated with the smart contract, the process for verifying the state of an actor 500 retrieves all transactions of the smart contract from the blockchain and all function parameters are decoded. Then, for each transaction in the smart contract, the process for verifying the state of an actor 500 retrieves (at 520) the stored off-chain accepted event artifact from the location asserted by the transaction function (the location being passed as a parameter of the function, as described above by reference to FIG. 4).

In some embodiments, when one or more artifact(s) are not found (at 525) during retrieval of the event artifact for each transaction in the contract, the process for verifying the state of an actor 500 proceeds to the step at which actor state verification fails (at 560). However, when the event artifact for each transaction in the contract is found and retrieved (at 520), the process for verifying the state of an actor 500 continues to compare retrieved artifacts with artifacts as stored, via comparison of Hash values, as described next.

Specifically, the process for verifying the state of an actor 500 of some embodiments de-serializes the retrieved artifact (at 530) by reading the artifact into the same in-memory format as used in the original serialization presented to the Hash function/algorithm, which is described above at step 365 by reference to FIG. 3. Next, the process for verifying the state of an actor 500 computes a hash for the retrieved artifact (at 535). Indeed, the hash of each serialized artifact is computed using the same Hash function/algorithm, as noted below at step 550. In some embodiments, the process for verifying the state of an actor 500 then compares (at 540) the artifact hash with the hash stored in the transaction of the smart contract associated with the Actor instance. In some embodiments, the steps for de-serializing the artifact (at 530), computing the artifact hash (at 535), and comparing the artifact hash with the hash stored in the transaction of the smart contract (at 540) are repeated for each retrieved artifact (at 550).

For each retrieved artifact, the process for verifying the state of an actor 500 determines whether the artifact hash matches the hash stored in the smart contract transaction based on the comparison (at 540). When the artifact hash does not match the hash stored in the transaction of the smart contract (at 545), the process for verifying the state of an actor 500 of some embodiments proceeds to the step at which actor state verification fails (at 560). On the other hand, when the artifact hash matches the hash stored in the smart contract transaction based on the comparison of all the retrieved event artifacts (at 540), then the process for verifying the state of an actor 500 regards the Actor state as verified, meaning the Actor state passes verification (at 555). Then the process for verifying the state of an actor 500 ends. Note that if any of the steps of the process for verifying the state of an actor 500 fail, then the Actor state is regarded as invalid and the process for verifying the state of an actor 500 proceeds the step at which actor state verification fails (at 560). In other words, all of the transaction hashes associated with all of the retrieved artifacts need to be successfully recomputed and the comparison of hashes (for the artifacts and the noted hashes of the transactions on the smart contract) need to be equal in order to regard the Actor state as being verified. Depending upon the type of verification failure and the domain needs of the Arene client or other implementing applications, the actor system may notify the client user via a visualized message to the GUI 315 or to the API 320 (both GUI 315 and API 320 described above, by reference to FIG. 3) upon confirmation of a verification failure (at 560), as some failures indicate that an attempt to alter, tamper with, or manipulate the Actor's smart contract and one or more of its historical transactions may have taken place.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
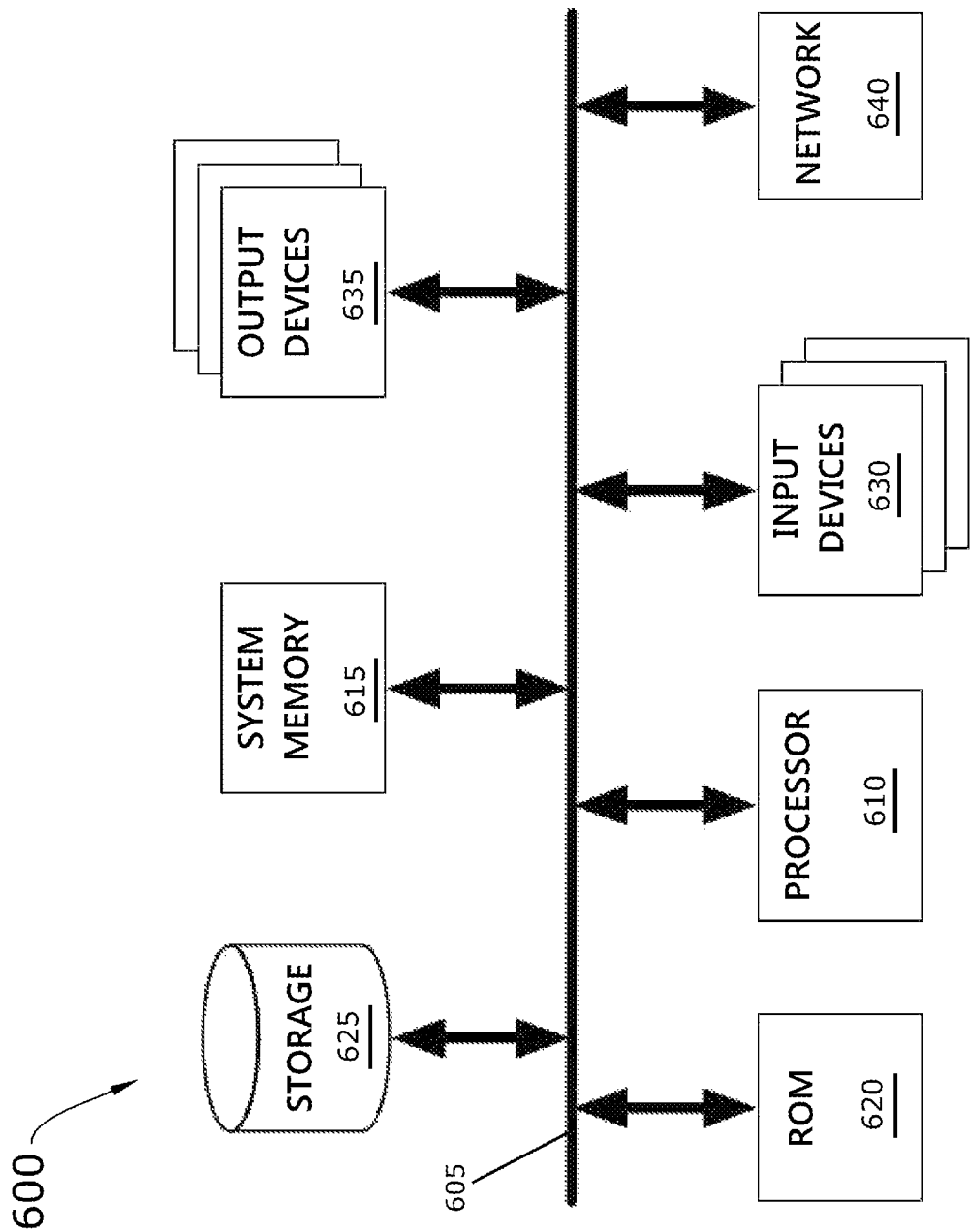
FIG. 6 conceptually illustrates an electronic system with which some embodiments of the invention are implemented.

FIG. 6 conceptually illustrates an electronic system 600 with which some embodiments of the invention are implemented. The electronic system 600 may be a computer, phone, PDA, or any other sort of electronic device. Such an electronic system includes various types of computer readable media with various types of interfaces. Electronic system 600 includes a bus 605, processing unit(s) 610, a system memory 615, a read-only-memory 620, a permanent storage device 625, input devices 630, output devices 635, and a network 640.

The bus 605 collectively represents all system, peripheral, and chipset buses that communicatively connect the numerous internal devices of the electronic system 600. For instance, the bus 605 communicatively connects the processing unit(s) 610 with the read-only 620, the system memory 615, and the permanent storage device 625.

From these various memory units, the processing unit(s) 610 retrieves instructions to execute and data to process in order to execute the processes of the invention. The processing unit(s) may be a single processor or a multi-core processor in different embodiments.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 625.

Other embodiments use a removable storage device (such as a floppy disk or a flash drive) as the permanent storage device 625. Like the permanent storage device 625, the system memory 615 is a read-and-write memory device. However, unlike storage device 625, the system memory 615 is a volatile read-and-write memory, such as a random-access memory. The system memory 615 stores some of the instructions and data that the processor needs at runtime. In some embodiments, the invention's processes are stored in the system memory 615, the permanent storage device 625, and/or the read-only 620. For example, the various memory units include instructions for processing appearance alterations of displayable characters in accordance with some embodiments. From these various memory units, the processing unit(s) 610 retrieves instructions to execute and data to process in order to execute the processes of some embodiments.

The bus 605 also connects to the input and output devices 630 and 635. The input devices enable the user to communicate information and select commands to the electronic system. The input devices 630 include alphanumeric keyboards and pointing or cursor control devices. The output devices 635 display images via the GUI 315, described above by reference to FIG. 3, and generated by the electronic system 600. The output devices 635 include printers and display devices, such as cathode ray tubes (CRT), liquid crystal displays (LCD), or organic light emitting diode (OLED) displays. Some embodiments include a touch-sensitive display (such as a "touchscreen") that functions as both an input and output device.

Finally, as shown in FIG. 6, bus 605 also couples electronic system 600 to a network 640 through a network adapter (not shown). In this manner, the computer can be a part of a network of computers (such as a local area network ("LAN"), a wide area network ("WAN"), or an Intranet), or a network of networks (such as the Internet). Any or all components of electronic system 600 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by sets of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, the immutable blockchain technology-based actor model state certification method and system may be applied to any process, domain, or industry in need of secure data storage and immutable certification of such data, without compromising on factors such as speed, performance, or cost. Also, the immutable blockchain technology-based actor model state certification method and system can be adapted for immutable tracking and certification of many digital objects across a variety of domains by implementing its use of hybridized blockchain technology as a supplement to existing domain logic and cloud storage mechanisms, as well as the logical mapping mechanism for doing so. As such, the immutable blockchain technology-based actor model state certification method and system may be easily applied to other software applications which expose domain entities that fit the Actor to Actor Message pattern for the purposes of certifying, creating an audit history, and tracking the ongoing state of those entities.

Furthermore, specific descriptions and examples herein are not limited to only those descriptions and/or illustrations, but are provided as reference to the underlying functions and features of the invention. In particular, FIGS. 3 and 5 conceptually illustrate processes. The specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for certification of actor model messages stored in event stores utilizing traditional data storage combined with blockchain smart contracts, said method comprising:
    creating a blockchain smart contract instance that is dedicated to an actor instance in an actor system comprising a blockchain, an on-chain storage of the blockchain, and an off-chain storage, wherein the actor instance is based on an actor state comprising a sequence of actor messages of an actor model, wherein the actor messages comprise actor history and actor artifacts;
    storing the blockchain smart contract instance in the on-chain storage of the blockchain;
    storing the actor history and the actor artifacts for the actor instance in the off-chain storage;
    applying the event messages to the actor instance;
    changing a state of the actor instance based on the applied event messages;
    serializing the applied event messages;
    obtaining a cryptographic digital hash value of a cryptographic digital hash function for each serialized applied event message associated with the change of state of the actor instance;
    storing event message data comprising the cryptographic digital hash of each encrypted serialized applied event message and a timestamp of the applied event message in the off-chain storage;
    verifying authenticity of the serialized applied event messages based on the sequence of actor messages and the event messages applied to the actor instance to authenticate the state of the actor instance before writing a blockchain transaction to store the serialized applied event messages according to the blockchain smart contract instance dedicated to the actor instance;
    encrypting, upon verifying authenticity of the serialized applied event messages, each serialized applied event message using the cryptographic digital hash function; and
    storing, on the blockchain transaction, each encrypted serialized applied event message in the on-chain storage of the blockchain.

2. The method of claim 1 further comprising:
    generating a transaction blockchain identifier;
    identifying a location of the off-chain traditional storage;
    generating a storage key associated with the identified location; and
    storing the timestamp, the cryptographic digital hash, and the storage key on the blockchain transaction according to the blockchain smart contract instance dedicated to the actor instance.

3. The method of claim 1, wherein the blockchain smart contract instance is a first blockchain smart contract instance, wherein the actor instance is a first actor instance with a first actor state in the actor system, wherein the first actor state is based on the sequence of actor messages and the event messages applied to the first actor instance.

4. The method of claim 3 further comprising:
    creating a plurality of blockchain smart contract instances that are dedicated to a plurality of actor instances in the actor system, wherein the plurality of blockchain smart contract instances comprises the first blockchain smart contract instance and a second blockchain smart contract instance dedicated to a second actor instance, wherein the plurality of actor instances comprises the first actor instance and the second actor instance, wherein a second actor state of the second actor instance is different from the first actor state of the first actor instance, wherein the second actor state is based on a second sequence of actor message and event messages applied to the second actor instance, wherein the second sequence of actor messages and event messages applied to the second actor instance is different from sequence of actor messages and the event messages applied to the first actor instance;
    obtaining cryptographic digital hash values for the second sequence of actor messages and event messages applied to the second actor instance;
    storing the second sequence of actor messages and event messages applied to the second actor instance in the off-chain storage;
    encrypting the second sequence of actor messages and event messages; and
    storing, in the on-chain storage of the blockchain on a second blockchain transaction, the encrypted second sequence of actor messages and event messages.

* * * * *